United States Patent
Brown et al.

(10) Patent No.: US 6,187,278 B1
(45) Date of Patent: Feb. 13, 2001

(54) PROCESS FOR CONTROLLING AMMONIA SLIP IN THE REDUCTION OF SULFUR DIOXIDE EMISSION

(75) Inventors: Gregory N. Brown, Palmyra; Michael L. Mengel, Fredericksburg; Michael T. Hammer, Birdsboro; Raymond R. Gansley, Lebanon, all of PA (US)

(73) Assignee: Marsulex Environmental Technologies, LLC, Lebanon, PA (US)

( * ) Notice: Under 35 U.S.C. 154(b), the term of this patent shall be extended for 0 days.

(21) Appl. No.: 09/149,190

(22) Filed: Sep. 8, 1998

(51) Int. Cl.[7] .................................................. B01D 53/50
(52) U.S. Cl. ........................................................ 423/243.06
(58) Field of Search ......................................... 423/243.06

(56) References Cited

U.S. PATENT DOCUMENTS

| | | | |
|---|---|---|---|
| 4,164,548 | 8/1979 | Vitall et al. | 423/242 |
| 4,690,807 | 9/1987 | Saleem | 423/242 |
| 5,362,458 | 11/1994 | Saleem et al. | 423/243.06 |

FOREIGN PATENT DOCUMENTS

| | | | |
|---|---|---|---|
| 0212523 A2 | 3/1987 | (EP) . | |
| 0620187 A1 | 10/1994 | (EP) . | |
| 64-90018 | * 4/1989 | (JP) | 423/243.06 |
| 64-90019 | * 4/1989 | (JP) | 423/243.06 |

* cited by examiner

Primary Examiner—Steven P. Griffin
Assistant Examiner—Timothy C Vanoy
(74) Attorney, Agent, or Firm—Gary M. Hartman; Domenica N. S. Hartman

(57) ABSTRACT

A process is provided for removing sulfur dioxide out of gases by feeding the gases into a scrubber, where they are counter-currently contacted with a descending solution containing ammonium hydroxide and ammonium sulfate so that the sulfur dioxide is sorbed into the solution containing ammonium hydroxide and ammonium sulfate and a scrubbed gas is discharged from the scrubber. The sulfur dioxide-loaded solution is collected in a sump at the bottom of the scrubber, where a mixture of ammonia and air is injected into the sulfur dioxide loaded solution so that the ammonia reacts with the sulfur dioxide to produce ammonium sulfite which is (in turn) oxidized by the air into ammonium sulfate. The mixture of air and ammonia is injected into the solution in a direction that is towards the bottom of the sump so that portions of solution containing a higher pH and higher ammonium sulfite levels than the remainder of the solution is avoided, thereby minimizing ammonia slip out of the scrubber.

9 Claims, 2 Drawing Sheets

PROCESS FOR CONTROLLING AMMONIA SLIP IN THE REDUCTION OF SULFUR DIOXIDE EMISSION

FIELD OF THE INVENTION

This invention generally relates to processes by which sulfur dioxide gas is removed from utility and industrial flue gases. More particularly, this invention is directed to a wet flue gas desulfurization process and apparatus in which ammonium sulfate is produced as a valuable byproduct from sulfur dioxide removed from flue gases using an ammonia-containing scrubbing solution, in which free ammonia and ammonium sulfate aerosol in the scrubbed flue gases is controlled.

BACKGROUND OF THE INVENTION

Gas-liquid contactors and absorbers are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and their emission into the atmosphere is closely regulated by clean air statutes. The method by which these gases are removed with a gas-liquid contactor or absorber is known as wet flue gas desulfurization.

The cleansing action produced by gas-liquid contactors and absorbers is generally derived from the passage of gas through a tower cocurrently or countercurrently to a descending liquid that absorbs sulfur dioxide. Wet flue gas desulfurization processes have typically involved the use of an alkaline scrubbing liquid, such as a calcium-based slurry or a sodium-based or ammonia-based solution. As used herein, a slurry is a mixture of solids and liquids in which the content of the solids can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; $CaO$). Such slurries react with the acidic gases to form precipitates that can be collected for disposal, recycling or sale. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts, such as calcium sulfite ($CaSO_3 \cdot \frac{1}{2}H_2O$), gypsum ($CaSO_4 \cdot 2H_2O$), calcium chloride ($CaCl_2$) and calcium fluoride ($CaF_2$). When desired, forced oxidation of the slurry by aeration is employed to ensure that all of the sulfites will be reacted to form sulfates, and thereby maximize the production of gypsum.

While gas-liquid contactors and absorbers utilizing calcium-based slurries as described above generally perform satisfactorily, their operation results in the production of large quantities of wastes or gypsum, the latter having only nominal commercial value. In contrast, ammonia-based scrubbing processes have been used in the art to produce a more valuable ammonium sulfate fertilizer. In these processes, sulfur dioxide is absorbed from flue gases with an ammonium sulfate solution, after which the sulfur dioxide is reacted with oxygen and anhydrous or aqueous ammonia injected into the solution to form additional ammonium sulfate solution or ammonium sulfate crystals (($NH_4)_2SO_4$). Particular examples of such processes are disclosed in U.S. Pat. Nos. 4,690,807 and 5,362,458, each of which are assigned to the assignee of the present invention. In addition to being required to react with sulfur dioxide to produce ammonium sulfate, ammonia also serves to increase the efficiency of sulfur dioxide removal by reducing the acidity of the ammonium sulfate solution, which becomes more acidic with the absorption of sulfur dioxide.

An ongoing demand in processes such as those taught in U.S. Pat. Nos. 4,690,807 and 5,362,458 is the ability to control ammonia slip, which is free ammonia in the scrubbed flue gases exiting the gas contactor or absorber. In addition to incurring an economic loss because of lost ammonia, free ammonia in the scrubbed flue gases reacts with uncaptured sulfur dioxide and trioxide to create an ammonium sulfate aerosol that is visible as a blue or white plume in the stack discharge, leading to secondary pollution problems. Controlling the amount of free ammonia in the desulfurization process is in part a function of the ammonia vapor pressure, which results from a combination of pH and levels of unoxidized ammonium sulfite produced by the reaction of sulfur dioxide and ammonia in the absence of sufficient oxygen. High pH values result in high ammonia vapor pressure, which promotes ammonia slip. High levels of unoxidized ammonium sulfite also promote ammonia slip.

Generally speaking, the use and addition of anhydrous or aqueous ammonia to control sulfur oxide gases have resulted in undesirable levels of ammonia slip and associated poor aerosol control. Accordingly, it would be desirable if a flue gas desulfurization process were available that involved the addition of anhydrous or aqueous ammonia while controlling ammonia slip.

SUMMARY OF THE INVENTION

It is an object of this invention to provide a flue gas desulfurization process that utilizes an ammonia-based scrubbing fluid to remove sulfur dioxide from flue gases produced by utility and industrial facilities.

It is another object of this invention that such a process is characterized by a reduced amount of ammonia slip, which corresponds to reduced levels of ammonia and ammonium sulfate aerosol in the scrubbed flue gases that exit the process.

It is a further object of this invention to provide an apparatus for carrying out the process of this invention.

The present invention provides a wet flue gas desulfurization process for removing sulfur dioxide from flue gases produced by processing operations of the type carried out in utility and industrial plants. In particular, the process utilizes an ammonium sulfate solution into which is injected ammonia and oxygen, which react with sulfur dioxide absorbed in the solution to produce ammonium sulfate as a valuable byproduct. More particularly, the process of this invention generally entails the steps of delivering flue gases containing sulfur dioxide to a contactor region of an absorber, into which a scrubbing solution containing ammonium sulfate is introduced to contact the flue gases and absorb sulfur dioxide. The scrubbing solution containing the sulfur dioxide is then accumulated in a vessel having a bottom wall and a side wall that defines a cross-section of the vessel. An oxygen-containing gas and an ammonia-containing fluid are introduced together into the vessel to react with the sulfur dioxide to produce ammonium sulfate. The scrubbing solution is continuously recycled from the vessel to the contactor region.

According to the invention, high pH values and high levels of unoxidized ammonium sulfite, whether localized or uniform throughout the scrubbing solution, can result in high ammonia vapor pressure which promotes ammonia slip. With this invention, localized high pH and ammonium sulfite levels within the scrubbing solution are inhibited by introducing dilute ammonia at the bottom wall of the vessel so that the ammonia is uniformly dispersed across the cross-section of the vessel prior to becoming intermixed with the remainder of the scrubbing solution in the vessel and prior to the scrubbing solution being recirculated to the contactor region of the absorber. The invention has shown that uniform dispersion of dilute ammonia eliminates pockets of high pH and ammonium sulfite levels in the scrubbing solution, yielding a more uniform and desirable pH level and reduced ammonium sulfite levels, which promote absorption of ammonia and control ammonia slip in the absorber.

In a preferred embodiment of the invention, aqueous ammonia is diluted with air, which also serves as the oxygen source for the reaction, and then dispersed near the bottom wall of the vessel through a plurality of conduits that extend across the cross-section of the vessel. The conduits are preferably located above the inlet through which the scrubbing solution is recycled to the absorber. Dilution of the ammonia with water and air and the particular configuration of the conduits used to inject the mixture are both deemed to be preferred features of the invention that achieve the objects of the invention.

From the above, it can be seen that the flue gas desulfurization process of this invention has the advantage of generating ammonium sulfate while controlling ammonia slip and the resulting ammonium sulfate aerosol. This process also reduces localized flashing (rapid boiling of water) due to the reaction of ammonia and water in the scrubbing solution, and minimizes flashing of ammonia into the gas phase due to depressurization of ammonium sulfate solution rich in ammonia as the solution is depressurized (expanded) across a nozzle used to atomize the solution in the contactor region of the absorber. Finally, the manner in which ammonia is diluted and then uniformly dispersed at the bottom of the vessel has been shown to promote a more rapid reaction with sulfur dioxide.

Other objects and advantages of this invention will be better appreciated from the following detailed description.

DETAILED DESCRIPTION OF THE INVENTION

In accordance with this invention, an improved flue gas desulfurization process and apparatus are provided, whereby sulfur dioxide gas entrained in a flue gas is removed through the use of scrubbing liquid to generate ammonium sulfate as a useful and valuable byproduct. While the invention will be described in reference to a desulfurization system that utilizes an absorber, those skilled in the art will recognize that the teachings of this invention can be readily applied to various other desulfurization systems, including gas-liquid contactors, scrubbing structures and various other equipment capable of being used in the process described for this invention. Furthermore, the desulfurization process of this invention is compatible with various systems capable of removing other undesirable gases, mist, dust, fumes, smoke and/or particulate matter from a stream of gas.

Figure 1:
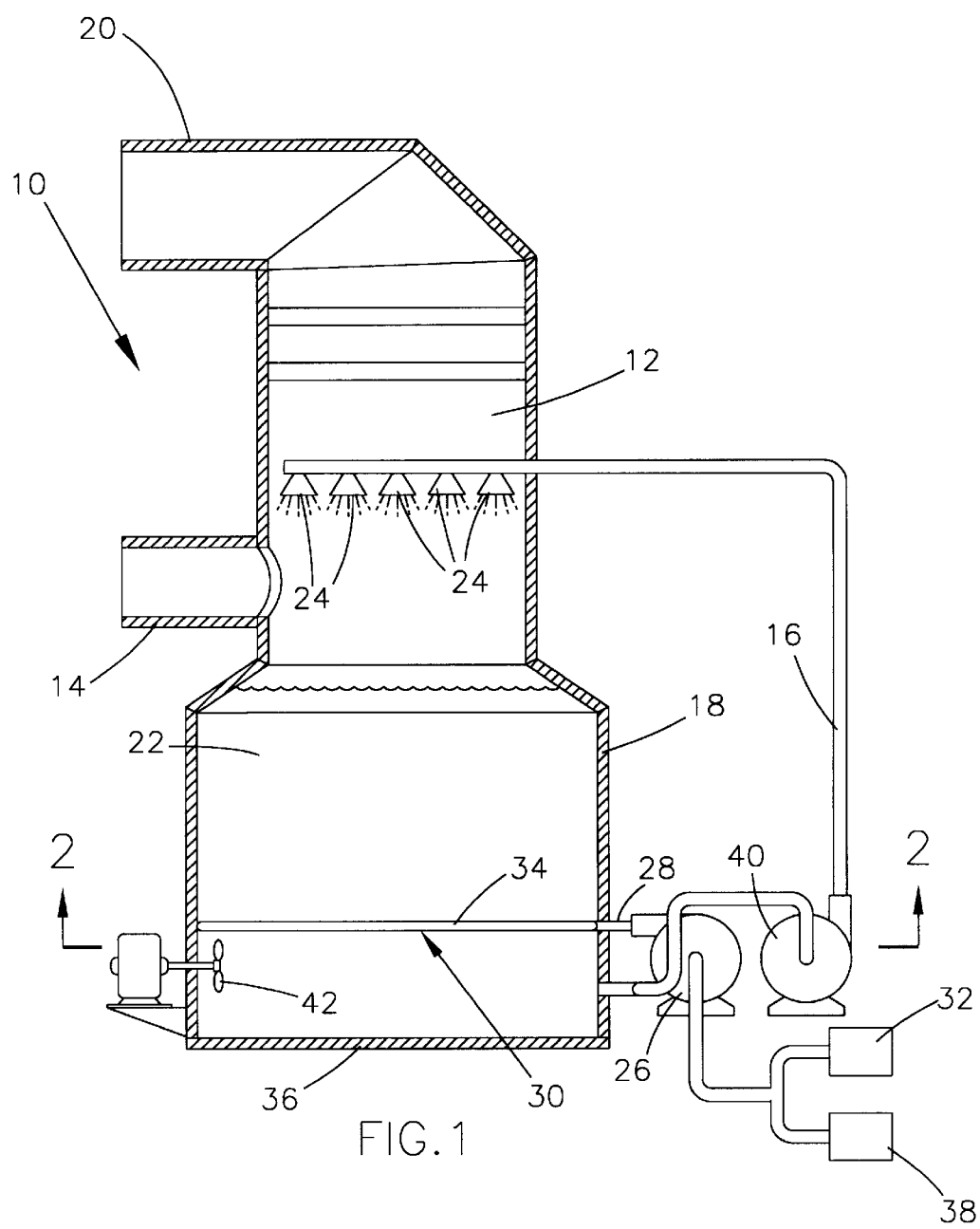
FIG. 1 is a schematic representation of an apparatus for a flue gas desulfurization process in accordance with this invention.

FIG. 1 is a schematic view of a flue gas scrubbing apparatus 10 in accordance with this invention. As shown, the apparatus 10 includes an upright absorber 12 that is supplied with flue gases through an inlet duct 14. The apparatus 10 operates in a manner that causes absorption of sulfur dioxide from the flue gases using a scrubbing liquid. The scrubbed flue gases that leave the absorber 12 are delivered to a stack (not shown) or other suitable equipment through an outlet duct 20. The source of the flue gases may be any process involving the combustion of fossil fuels or various industrial operations by which undesirable gases or particulate matter are produced.

Figure 2:
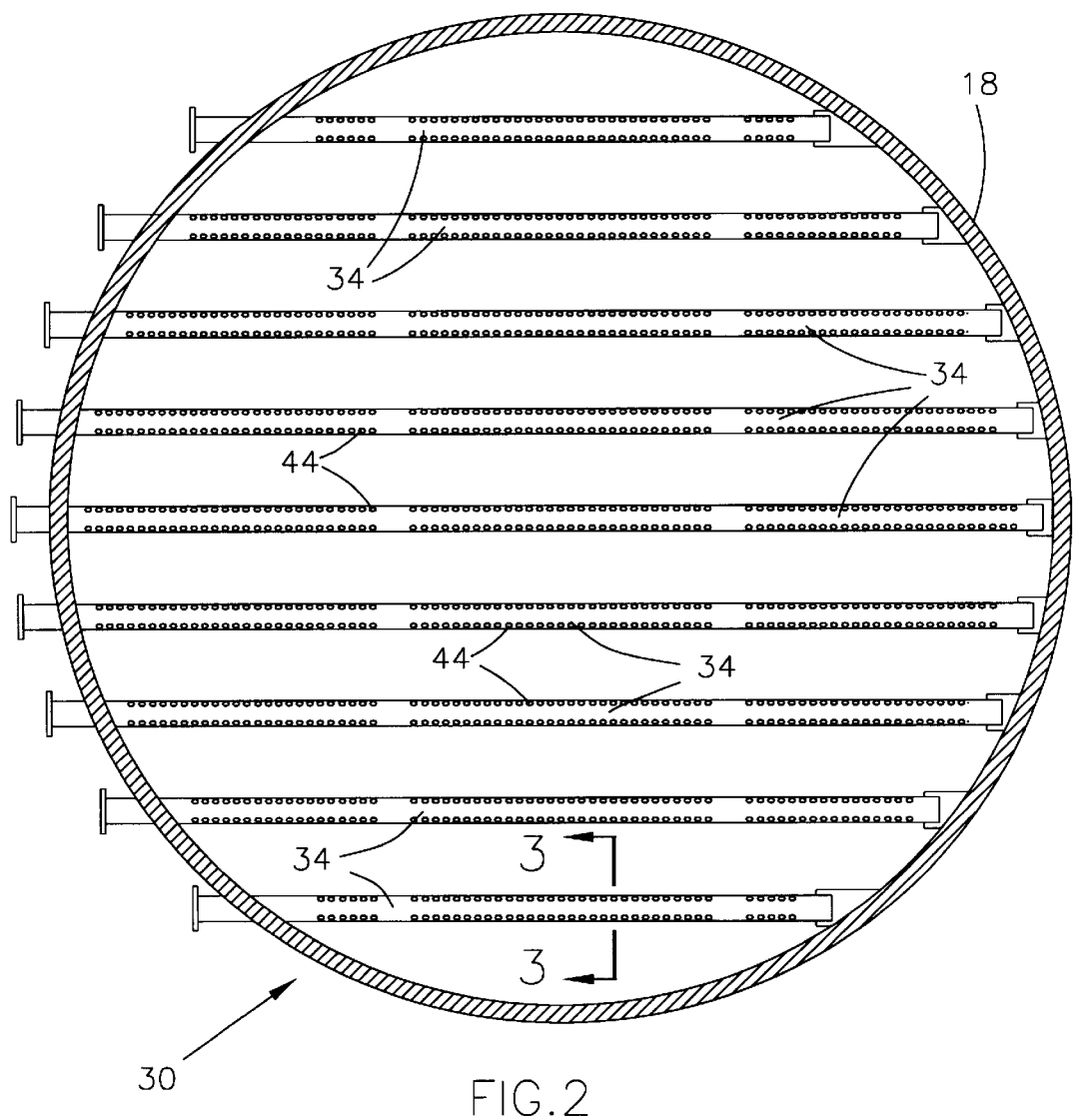
FIG. 2 is a cross-sectional view of the apparatus of FIG. 1 along line 2—2.

In accordance with this invention, the liquid is an ammonia-rich scrubbing solution 22, and more preferably an aqueous ammonium sulfate solution 22 containing free dissolved ammonia as the reagent for the desulfurization process. As will be discussed in greater detail below with reference to FIG. 2, FIG. 1 shows ammonia being delivered from a source 32 to a reaction vessel 18 via a pump 26, conduit 28 and injection system 30. The ammonia is preferably an aqueous solution of about 7:1 to 3:1 weight ratio of water to ammonia. Ammonia is a primary reactant when producing ammonium sulfate as a byproduct of the desulfurization process, and the ammonium sulfate solution 22 serves as the liquid vehicle for delivering the ammonia to the absorber 12. As shown in FIG. 1, a recirculation pump 40 serves to recycle the ammonium sulfate solution 22 from the vessel 18 through a conduit 16 to a contactor region of the absorber 12, where the solution 22 is introduced through a number of nozzles 24 or other suitable devices.

The scrubbing process involves spraying the ammonium sulfate solution 22 into the absorber 12 so as to provide intimate contact between the solution 22 and the flue gas. As a result, the solution 22 absorbs sulfur dioxide and other acid gases, such as hydrogen chloride (HCl) and hydrogen fluoride (HF), if they are present in the flue gases. The solution 22 then falls into the reaction vessel 18, where the absorbed sulfur dioxide reacts with the ammonia and is oxidized to form ammonium sulfate. Specifically, sulfur dioxide reacts with ammonia to form ammonium sulfite $((NH_4)_2SO_3 \cdot H_2O)$ and ammonium bisulfite $(NH_4HSO_3)$, which are oxidized in the presence of sufficient oxygen to form ammonium sulfate and ammonium bisulfate $(NH_4HSO_4)$, the latter of which reacts with ammonia to form additional ammonium sulfate. A portion of the ammonium sulfate solution 22 and/or ammonium sulfate crystals that form in the solution 22 can then be drawn off to yield the desired byproduct of this reaction. A sufficient amount of ammonium sulfate is preferably removed from the ammonium sulfate solution 22 prior to delivery to the absorber 12 in order to maintain ammonium sulfate at a desired concentration in the solution 22, which has typically been about 2% up to the saturation level of ammonium sulfate (46% total dissolved solids). However, in accordance with copending U.S. patent application Ser. No. 09/149,211, a preferred solution has a dissolved concentration above 46% to about 48% total dissolved solids, so as to have suspended solids of ammonium sulfate precipitate in a range of preferably about 1% to 20% total suspended solids.

In accordance with prior practices, sufficient ammonia is delivered to the vessel 18 to control the pH of the ammonium sulfate solution 22 within a typical range of about 4 to 6 pH range, such that the solution 22 is highly reactive for high efficient capture of sulfur oxide gases. As indicated above, a reaction occurs during the scrubbing operation between the injected ammonia and sulfur dioxide that, with forced oxidation, results in the production of additional ammonium sulfate. If hydrogen chloride and/or hydrogen fluoride are present in the flue gas, as is the case with flue gas produced by the combustion of coal, these acidic gases are also captured to form ammonium chloride and ammonium fluoride.

The present invention is based on the determination that the manner in which the prior art has injected ammonia promotes high levels of ammonia slip, meaning that free ammonia enters the absorber 12, some of which reacts with sulfur dioxide to form an ammonium sulfate aerosol, resulting in ammonia and ammonium sulfate aerosol escaping the absorber 12 and being discharged into the atmosphere. As a solution to this problem, the present invention entails injecting ammonia into the ammonium sulfate solution 22 in the reaction vessel 18 in a dilute form (with air and water) and through the injection system 30 shown in FIGS. 1 and 2, which in combination have been determined to reduce the likelihood of free ammonia escaping the absorber 12. Specifically, it has been determined through the present invention that lower ammonia slip occurs if ammonia is intentionally diluted with water and oxygen (e.g., air) prior to being injected evenly over the bottom cross-section of the vessel 18. In particular, uniform dispersion of dilute ammonia has been shown to reduce the likelihood that pockets of high pH and high ammonium sulfite levels will be present in the solution 22, such that more uniform and desirable pH and ammonium sulfite levels are achieved that promote absorption of ammonia and control ammonia slip in the absorber 12. As shown in FIG. 1, ammonia is diluted with oxygen from a suitable source 38, and the resulting mixture is then delivered through the conduit 28 to the vessel 18 via the injection system 30. Air is a suitable source for the oxygen, with a preferred ammonia:air weight ratio being about one to about five.

Figure 3:
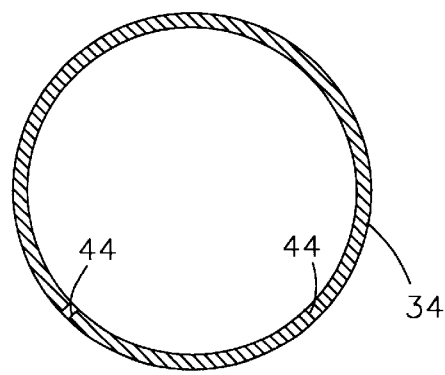
FIG. 3 is a cross-sectional view of a distribution tube employed by the apparatus.

The injection system 30 shown in FIGS. 1 and 2 includes a number of parallel conduits 34 that uniformly disperse the dilute ammonia near the bottom 36 of the reaction vessel 18, and preferably about ten feet (about three meters) from the bottom 36. To achieve the desired results, the conduits 34 are located above the inlet to the pump 40 and conduit 16. As shown in FIG. 3, another feature of the injection system 30 is that the air/ammonia mixture is directed downward toward the bottom 36, and not horizontally or upward into the vessel 18. Injecting the mixture through apertures 44 having diameters of about three-eighths inch (about 9.5 millimeters) and at an angle of about 45 degrees to the bottom 36 has been shown to achieve the desired results. Importantly, the configuration of the injection system 30 shown in the Figures has resulted in significantly reduced ammonia slip, which was attributed to the absence of pockets of high pH and high ammonium sulfite levels in the solution 22. According to this invention, aqueous ammonia and oxygen introduced with the injection system 30 circulates through the reaction vessel 18 from the natural circulation established with the recirculation pump 40, the continuous injection of aqueous ammonia and air via the injection system 30, and any agitators present, such as the fan 42 shown in FIG. 1.

In view of the above, it can be seen that a significant advantage of the present invention is that, while prior art desulfurization processes that use ammonia-based scrubbing solutions have been prone to relative high levels of ammonia slip, the present invention controls ammonia slip by way of the manner in which ammonia is introduced into a flue gas desulfurization system to reduce the tendency for localized high pH and ammonium sulfite levels. Other advantages of this invention include minimized localized flashing due to reactions between ammonia and water in the solution 22, minimized flashing of ammonia into the gas phase when expanded through the nozzles 24, and a more rapid reaction of the solution 22 with sulfur dioxide.

While the current invention has been described in terms of preferred embodiments, it is apparent that other forms could be adopted by one skilled in the art. For example, the features of this invention could be incorporated within flue gas desulfurization systems that differ from that represented in the Figures, slurry compositions could be employed that include constituents in addition to those disclosed, and other and/or additional equipment could be employed to further process the solutions and slurries used by the process, as well as process those compounds produced by the flue gas desulfurization system. Accordingly, the scope of the invention is to be limited only by the following claims.

What is claimed is:

1. A process for removing sulfur dioxide from flue gases, the method comprising the steps of:

delivering flue gases containing sulfur dioxide to a contactor region of an absorber;

introducing a scrubbing solution containing ammonium sulfate into the absorber, the scrubbing solution contacting the flue gases and absorbing sulfur dioxide from the flue gases;

accumulating the scrubbing solution containing the sulfur dioxide in a vessel having a bottom wall and a side wall that defines a cross-section of the vessel;

introducing a mixture of an oxygen-containing gas and a dilute ammonia-containing fluid into the scrubbing solution within the vessel through a single injections means to react with the sulfur dioxide to produce ammonium sulfate, the mixture of the oxygen-containing gas and the dilute ammonia-containing fluid being introduced into the vessel in a direction toward the bottom wall of the vessel and dispersed evenly across the cross-section of the vessel at the bottom wall of the vessel; and recirculating the scrubbing solution to the contactor region, wherein the mixture of the dilute ammonia-containing fluid and oxygen-containing gas is intermixed with the scrubbing solution within the vessel and prior to the scrubbing solution within the vessel being recirculated to the contactor region so as to eliminate portions of scrubbing solution within the vessel having a higher pH and a higher ammonium sulfite level than the remainder of the scrubbing solution within the vessel.

2. A process as recited in claim 1, wherein the oxygen-containing gas is air.

3. A process as recited in claim 1, wherein the scrubbing solution is agitated while in the vessel.

4. A process as recited in claim 1, wherein the scrubbing solution is maintained at a pH of about 4 to about 6 within the vessel.

5. A process as recited in claim 1, wherein the oxygen-containing gas is air and the dilute ammonia-containing fluid comprises ammonia and wherein the air and ammonia are mixed at an ammonia:air weight ratio of about one to about five.

6. A process as recited in claim 1, wherein said single injection means comprises a plurality of parallel conduits across the cross-section of the vessel.

7. A process as recited in claim 6, wherein the conduits inject the mixture of the oxygen-containing gas and the dilute ammonia-containing fluid at an oblique angle to the bottom wall of the vessel.

8. A process as recited in claim 6, wherein the conduits inject the mixture of the oxygen-containing gas and the dilute ammonia-containing fluid above an outlet through which the scrubbing solution is recirculated to the contactor region.

9. A process for removing sulfur dioxide from flue gases, the method comprising the steps of:

delivering flue gases containing sulfur dioxide to a contactor region of an absorber;

circulating a scrubbing solution containing ammonium sulfate from a vessel to the absorber, the scrubbing solution contacting the flue gases and absorbing sulfur dioxide from the flue gases;

accumulating the scrubbing solution containing the sulfur dioxide in the vessel, the vessel having a bottom wall and a side wall that defines a cross-section of the vessel;

agitating the scrubbing solution in the vessel with an agitation means;

introducing a mixture of air and an aqueous ammonia solution into the vessel through a single injection means to react with the sulfur dioxide to produce ammonium sulfate, the aqueous ammonia solution having a weight ratio of water to ammonia of about 7:1 to about 3:1, the aqueous ammonia solution and the air being mixed at an ammonia:air weight ratio of about 1 to about 5 prior to being introduced into the vessel at a distance of about three meters above the bottom wall of the vessel and dispersed evenly across the cross-section of the vessel at the bottom wall of the vessel through the single injection means, the single injection means comprising a plurality of conduits that extend across the cross-section of the vessel, the conduits injecting the mixture above an outlet through which the scrubbing solution is recirculated to the contactor region; and recirculating the scrubbing solution to the contactor region;

wherein the mixture of air and the aqueous ammonia solution is intermixed with the scrubbing solution within the vessel and prior to the scrubbing solution within the vessel being recirculated to the contactor region so as to eliminate portions of scrubbing solution within the vessel having a higher pH and a higher ammonium sulfite level than the remainder of the scrubbing solution within the vessel.

* * * * *